United States Patent [19]

Shine

[11] Patent Number: 4,803,084

[45] Date of Patent: Feb. 7, 1989

[54] SHELF-STABLE, SOFT DOUGH PRODUCT

[75] Inventor: Ward Shine, Irving, Tex.

[73] Assignee: Frito-Lay, Inc., Dallas, Tex.

[21] Appl. No.: 790,602

[22] Filed: Oct. 23, 1985

[51] Int. Cl.$^4$ ............................ A21D 2/16; A21D 8/04
[52] U.S. Cl. ........................................ 426/20; 426/28; 426/64; 426/549; 426/653
[58] Field of Search ............. 426/549, 94, 653, 19–21, 426/27, 28, 64, 558

[56] References Cited

U.S. PATENT DOCUMENTS

| | | | |
|---|---|---|---|
| 1,247,349 | 11/1917 | Wahl et al. | |
| 4,291,065 | 9/1981 | Zobel et al. | 426/549 |
| 4,360,534 | 11/1982 | Brabbs et al. | 426/560 |
| 4,416,903 | 11/1983 | Cole | 426/18 |
| 4,455,333 | 6/1984 | Hong et al. | 426/94 |
| 4,456,625 | 6/1984 | Durst | 426/106 |
| 4,503,080 | 3/1985 | Brabbs et al. | 426/94 |
| 4,511,585 | 4/1985 | Durst | 426/106 |
| 4,575,461 | 3/1986 | Friedman et al. | 426/549 |
| 4,624,856 | 11/1986 | Vanderveer et al. | 426/549 |

FOREIGN PATENT DOCUMENTS 0136158  4/1985  European Pat. Off. ............ 426/558

Primary Examiner—Donald E. Czaja
Assistant Examiner—Mary S. Mims
Attorney, Agent, or Firm—Bernard, Rothwell & Brown

[57] ABSTRACT

Shelf-stable, soft dough products having water activities of about 0.75 or less are produced by preparing a leavened dough; adding to the leavened dough at least one antifirming agent including an oligosaccharide, a monoglyceride ester and maltodextrin and/or corn syrup solids; forming the dough; and cooking the formed dough.

11 Claims, 1 Drawing Sheet

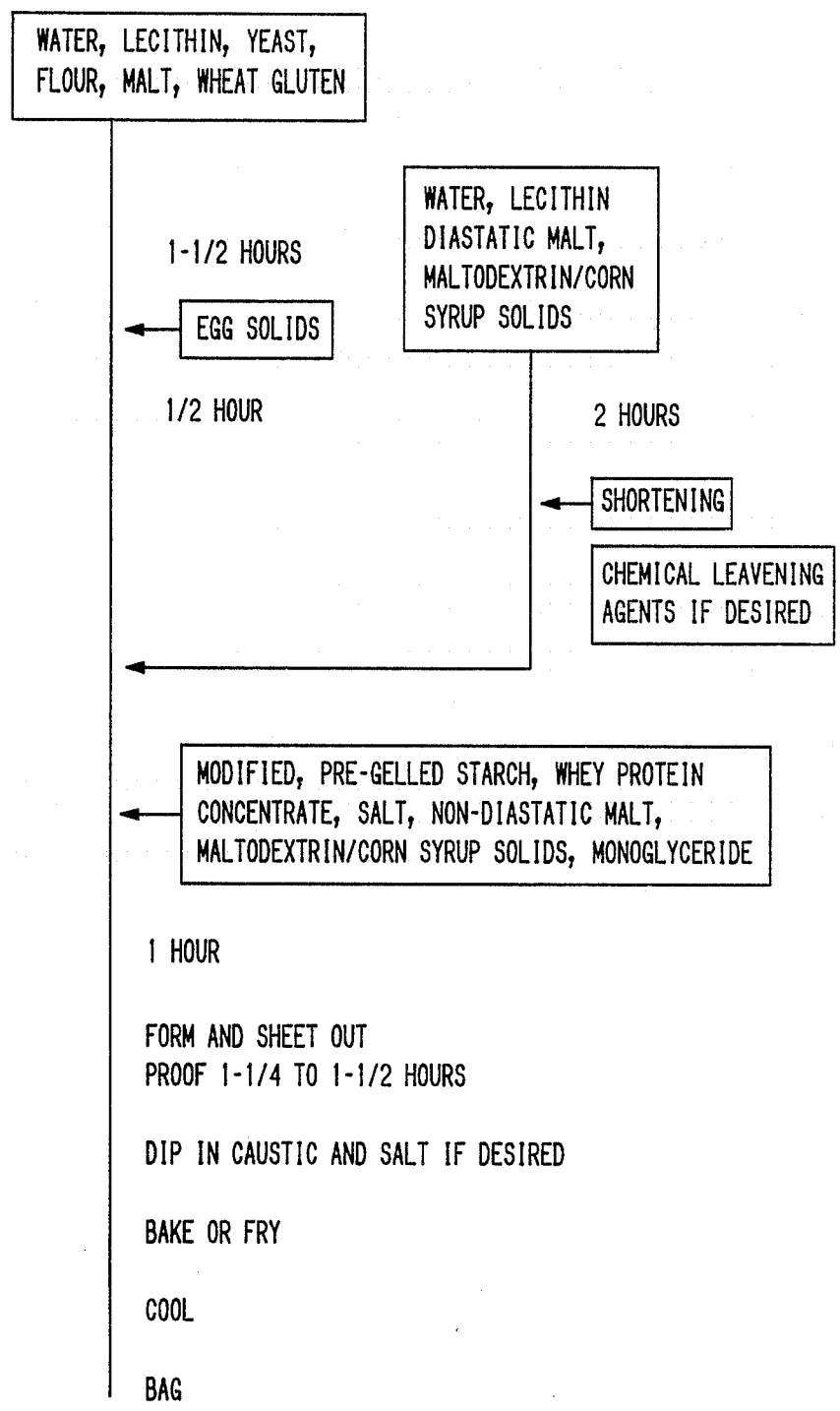

SHELF-STABLE, SOFT DOUGH PRODUCT

BACKGROUND OF THE INVENTION

This invention relates to the preparation of shelf-stable, soft dough products such as soft pretzels, breads and cookies. The products of the invention can be provided in the form of fried or baked ready-to-eat goods, which have excellent shelf-stability.

One of the major problems associated with ready-to-eat dough products is their short shelf life. In order to compete with freshly made products, previously cooked and prepackaged dough products must be shipped to the retailer for sale before they begin to lose their original qualities of texture, flavor and moistness. Using previously available methods, it has not been possible to produce ready-to-eat soft dough products having a shelf life in excess of about 14 to 30 days.

Almost immediately after cooking, a dough product begins to lose its soft texture. Water activity ($A_w$) is a major determinative factor in the shelf life of dough products. Water activity, which can be defined as the ratio of the fugacity of water in the system being studied to the fugacity of pure water at the same temperature, is a measure of how tightly a material binds water molecules. In other words, $A_w$ is a measure of the tendency of a material to allow water to migrate to the surrounding environment. A relatively high $A_w$, i.e., an $A_w$ approaching 1.0, indicates a tendency to allow water to migrate easily out of the material. Thus, cooked dough products with high $A_w$ values tend to lose moistness and undergo textural changes within a relatively short period of time.

$A_w$ is a particularly important factor in product stability when the dough product is employed in contact with other materials such as fillings, toppings or materials applied topically to impart flavor or texture variety. For example, soft pretzels generally have salt deposited on their surfaces in the form of crystals which impart flavor and texture variety to the product. It is important that this surface salt maintain its crystalline integrity. If the $A_w$ of the soft pretzel exceeds about 0.72, water migration out of the product tends to dissolve the salt crystals on the surface. If the product is to be filled with a filling such as a jam or creme filling, it is important that the $A_w$ of the dough product and the filling do not differ by much, since differing water activities will result in water migration between the filling and the dough product.

Products having relatively high $A_w$ values also tend to be subject to microbial activity which further contributes to poor shelf-stability.

It is readily apparent from the foregoing discussion that the ability to control water activity in cooked dough products, particularly the ability to minimize water activity, is crucial to the obtainment of shelf-stable products. Sugars, such as high fructose corn syrup, sucrose, honey and the like, can be added to doughs in order to reduce water activity, thus prolonging shelf life. However, these sugars are high in mono- and disaccharides which impart sweetness to the product. High levels of sweetness are undesirable in many baked products such as breads and soft pretzels. Lack of shelf-stability of precooked dough products has made it virtually impossible for large-scale snack food processors to compete with certain fresh-baked goods low in sweetness, such as soft pretzels.

U.S. Pat. No. 4,456,652 discloses a method of producing ready-to-eat baked goods from a flour containing batter mix, water and at least 5% by weight of the product of an edible, liquid polyhydric alcohol. U.S. Pat. No. 4,511,585 discloses a similarly produced product, the primary difference being the ratio of flour to edible, liquid polyhydric alcohol. The water activities of the baked products are generally in the range from about 0.75 to 0.85.

U.S. Pat. No. 4,291,065 describes the use of certain sugars as anti-staling agents, including oligosaccharides having from two to three hexose or pentose units.

SUMMARY OF THE INVENTION

This invention provides a method for preparing a shelf-stable, soft dough product such as a soft pretzel. The products produced by the method of the invention have water activities of about 0.75 or less, which contributes to their long shelf life. The soft dough products produced by the method of the invention are inherently low in sweetness (although they can be sweetened, if desired). The shelf-stable, soft dough products are prepared by a method which comprises:
(a) preparing a leavened dough from a mixture comprising flour, water and a leavening agent;
adding to the leavened dough
  (i) at least one antifirming agent including an oligomaltosaccharide;
  (ii) a monoglyceride ester; and
  (iii) maltodextrin and/or corn syrup solids;
(c) forming the dough into a desired configuration; and
(d) cooking the formed dough.

In a preferred embodiment of the invention, the amount of the oligomaltosaccharide antifirming agent is increased by subjecting maltodextrin to the enzymatic activity of diastatic malt or alpha-amylase. Advantageously, there are also added to the leavened dough a modified, pre-gelled starch, both lactose and whey protein (added in the form of whey protein concentrate) and texture developing agents such as wheat gluten and egg solids.

BRIEF DESCRIPTION OF THE DRAWINGS

The FIGURE is a flow chart which illustrates a preferred embodiment for carrying out the method of this invention.

DETAILED DESCRIPTION OF THE PREFERRED EMBODIMENTS

The method of the invention will be understood from the following description and by reference to the FIGURE, which illustrates a preferred embodiment of the invention. It is to be understood that other polyhydric alcohols such as maltodextrins and/or corn syrup solids in reduced form can replace maltodextrins and/or corn syrup solids.

In accordance with the method of the invention, a leavened dough is prepared from a mixture comprising flour, water and a leavening agent. Preferably, the leavening agent is yeast, i.e., baker's yeast, but chemical leavening agents such as ammonium bicarbonate can also be used. Any type of flour conventionally used to prepare dough products can be employed, with bread flour being preferred. When yeast is employed as the leavening agent, the yeast is suspended in water using a food grade surfactant such as lecithin. The flour is preferably admixed with a texture developing agent such as wheat gluten prior to adding the yeast suspension. Advantageously, diastatic malt is also admixed with the flour/gluten mixture prior to adding the yeast suspension. The malt serves as an agent to break down starch, some of the breakdown products being sugars which serve as yeast food. The malt also serves to impart flavor. The flour/gluten mixture is then added to the yeast suspension and allowed to ferment. Additional texture developing agents such as egg solids can be added to the dough mixture during fermentation. A desirable texture is generally achieved after about 30 min. to 120 min. fermentation, depending on temperature.

One or more antifirming agents are added to the leavened dough including an oligomaltosaccharide. The term "oligomaltosaccharide" refers to molecules having from about 3 to about 10 saccharide units, i.e., a D.P. from 3 to about 10. Oligomaltosaccharides can be obtained from starch hydrolyzates, such as corn syrup solids, inasmuch as a significant proportion of starch hydrolyzate molecules contain from 3 to about 10 saccharide units. It is preferred, however, to increase the proportion of these oligosaccharides (3–10 saccharide units) by subjecting corn syrup solids (or maltodextrin, depending on intended product texture) to the enzymatic activity of diastatic malt. I have found that this method results in a molecular distribution which favors the desired number of oligomaltosaccharides which have the desired antifirming properties. In accordance with this preferred embodiment, a food grade surfactant such as lecithin is mixed with water. Diastatic malt and maltodextrin and/or corn syrup solids are then dispersed in the aqueous medium. The α-amylase activity of the diastatic malt breaks down the polysaccharides (the maltodextrins) into molecules of shorter chain length, i.e., oligomaltosaccharides. It is preferred for this purpose to employ maltodextrin and/or corn syrup solids having an average D.E. value from about 10 to 30. The enzymatic activity of the malt is optimal at a temperature from about 70° F. to 100° F. At these temperatures, the enzymatic degradation of maltodextrin to oligomaltosaccharides of desired chain length is normally complete in about 30 to 120 min. Alternatively, microbial alpha-amylase can be used, at a somewhat higher temperature, to break down the polysaccharides. The aqueous mixture containing the oligomaltosaccharides can be added directly to the leavened dough. If desired, a small amount of shortening and/or chemical leavening agents can be added to the oligomaltosaccharide-containing mixture before it is mixed into the dough. I have found that the addition of shortening and/or leavening agents at this stage contributes to a softer, less dense texture in the final product.

In addition to the aqueous oligomaltosaccharide-containing mixture, there are also added to the leavened dough a monoglyceride ester and maltodextrin and/or corn syrup solids. The monoglyceride ester acts as an antifirming agent and contributes softness to the texture of the final product. Fatty acid monoglyceride esters are preferred, particularly those containing a large proportion of saturated fatty acid monoesters. A suitable source of monoglyceride esters is a commercially available product known as MYVEROL (Eastman Kodak Co., Kingsport, Tenn.), which contains primarily fatty acid monoglyceride esters, about 50% of which are saturated fatty acid esters. One can also use, for example, a mixture of about 80% DIMODAN PV300K EF (Grinsted Products, Inc., Industrial Airport, Kansas), which is a powdered monoglyceride ester and about 20% PANODAN 150K (Grinsted Products, Inc., Industrial Airport, Kansas), diacetyl tartaric acid esters of monoglycerides. The latter mixture of monoglyceride esters produces a somewhat softer texture than DIMODAN PV300K EF alone, but not as soft as MYVEROL.

The maltodextrin and/or corn syrup solids which are added to the leavened dough plasticize the dough and help to reduce water activity. Preferably, the maltodextrin and/or corn syrup solids have D.E. values from about 10 to about 20. Maltodextrins and/or corn syrup solids having D.E. values of 10 and 20, respectively, are commercially available, for example, as MALTRIN®M100 and MALTRIN®M200 (Grain Processing Corp., Muscatine, Iowa). Use of higher D.E. value maltodextrin and/or corn syrup solids results in a product having softer texture.

Other ingredients which may advantageously be added to the leavened dough include modified, pre-gelled starches, non-diastatic malt, additional antifirming agents such as lactose, seasonings such as salt and flavoring agents such as vanilla extract, orange extract, cocoa, etc. Pre-gelled starch has a beneficial effect on the water-binding properties of the product. Lactose can be provided conveniently to the dough in the form of whey protein concentrate, such as MELOSKIM WP-34 (Dairyland Products, Inc., Savage, Minn.). While not wishing to be bound by any particular theory or mechanism, it is believed that the whey protein concentrate may have a beneficial effect on the water-binding properties of the dough. The non-diastatic malt, when present, acts primarily as a flavor enhancer. These ingredients are added to the leavened dough and mixed thoroughly into the dough.

The various ingredients discussed above are preferably employed in amounts indicated below to produce the shelf-stable, soft dough product of the invention. All percentages given are based on the weight of the uncooked dough.

| Ingredient | % of Dough |
| --- | --- |
| Maltodextrin/corn syrup solids | 20–50 |
| Flour | 15–40 |
| Water | 15–30 |
| Monoglyceride | 2–8 |
| Yeast | 1–5 |
| Pre-gelled starch | 0–15 |
| Whey protein concentrate | 0–10 |
| Egg solids | 0–6 |
| Wheat gluten | 0–6 |
| Diastatic malt | 0–3 |
| Non-diastatic malt | 0–3 |
| Shortening | 0–4 |
| Salt | 0–1 |
| Lecithin | 0–1 |

The amount of maltodextrin and/or corn syrup solids indicated above includes that which is employed as the starting material to increase the amount of oligomaltosaccharide antifirming agent. About one-half of the maltodextrin and/or corn syrup solids is usually employed for this purpose.

After all the ingredients have been combined and thoroughly admixed as described above, the dough is formed into the desired shape and proofed. Proofing is preferably carried out at a relative humidity of about 80% and a temperature from about 80° F. to 90° F. for about ¼ to 1½ hours. Proofing results in a lighter texture in the final product.

If one desires to produce a product of the soft pretzel type, it may be desirable to dip the formed dough in an aqueous NaOH solution (about 0.1M to 0.4M) and/or apply salt to the surface before cooking. The use of a caustic dip is common practice in the pretzel-making industry. It produces an increase in reducing sugars, which results in increased surface browning upon cooking.

The formed dough can be cooked by baking or frying, depending on the desired characteristics of the final product.

If desired, the soft dough product can be filled with or laminated to other compatible food materials such as fillings. The fillings can be provided to the dough product before or after cooking, provided that the filling must be thermostable or capable of being cooked if it is to be provided to the dough product before cooking. It is preferred that the $A_w$ (after cooking) of the filling and the dough product not differ by more than about 0.04 in order to inhibit the migration of moisture between the dough and the filling which might result in textural changes. Suitable filling materials include meats such as salami; thermostable cheeses; jams; peanut butter and thermostable cremes.

The dough product can also be laminated or coated with other food products such as salt, sugar(s), cheese powder, onion powder, etc. to impart desired flavor characteristics or with one or more other doughs produced by the method of the invention, but having different texture or flavor characteristics. In one embodiment of the invention, several different doughs, each produced by the method of the invention but having different texture and/or flavor characteristics, can be laminated and cooked together. In this manner, it is possible, for example, to produce a cookie which has a dual texture. An inner dough can be prepared using corn syrup solids having a relatively high D.E. value, e.g., D.E. 20. This dough is encased in or laminated to a second dough which is prepared using a maltodextrin having a relatively low D.E. value, e.g., D.E. 10. Upon baking, the resultant cookie has a relatively firm layer, e.g., an outer layer, and a relatively soft layer, e.g., an inner layer, due to the different softening effects of the maltodextrins and/or corn syrup solids used.

The following examples are intended to further illustrate the practice of the invention and are not intended to limit the scope of the invention in any way. Unless otherwise indicated, all parts and percents are by weight and all temperatures are in degrees Fahrenheit.

EXAMPLE I

A shelf-stable, soft pretzel was prepared from the following ingredients:

| Ingredients | % |
| --- | --- |
| Maltodextrin/corn syrup solids (Maltrin ® M200, D.E. 20) | 31.25 |
| Bread flour | 25.39 |
| Modified, pre-gelled starch (CLEARJEL ®) | 5.86 |
| Monoglyceride (MYVEROL ®) | 3.91 |
| Whey protein concentrate (MELOSKIM ® WP-34) | 3.13 |
| Egg solids (whole) | 2.93 |
| Yeast | 2.93 |
| Wheat gluten | 1.95 |
| Diastatic malt | 1.17 |
| Non-diastatic malt | 0.78 |
| Shortening | 0.78 |
| Salt | 0.29 |
| Lecithin | 0.10 |
| Water | 19.53 |
| Total | 100.00 |

The lecithin was dispersed in the water and the yeast was then suspended in three-fourths of the lecithin/water dispersion. The wheat gluten was mixed with two-thirds of the diastatic malt and four-fifths of the bread flour. To this mixture the yeast suspension was added and mixed thoroughly. Yeast fermentation was allowed to occur in a moist atmosphere (to prevent surface drying) for 1½ hours, which resulted in the dough rising.

The remaining one-third of the diastatic malt was added to one-half the maltodextrin and the mixture was mixed with the remaining one-fourth of the lecithin solution. The mixture was allowed to sit, covered, for 2 hours to allow the α-amylase in the malt to break down the maltodextrin/corn syrup solids.

The modified, pre-gelled starch and the whey protein concentrate were added to the monoglyceride (which had been melted) and mixed to a uniform consistency. The remaining one-fifth of the bread flour, salt, non-diastatic malt and the remaining one-half of the maltodextrin were added to this mixture and mixed thoroughly.

After the initial 1½-hour fermentation period, the egg solids were added to the leavened dough and fermentation was continued for an additional ½ hour. The maltodextrin/malt suspension, which had sat for two hours (i.e., the oligomaltosaccharide antifirming agent), was then added to the dough with mixing. The mixture containing the modified, pre-gelled starch, whey protein concentrate and monoglyceride was then mixed into the dough. After 1 hour, the dough ($A_w$ 0.84) was formed into pretzels and proofed for 1¼ hours at 90% relative humidity and 90° F. The formed, proofed dough was then dipped in 0.2 M aqueous NaOH for 0.25 min. and the surface was salted with flaked salt. The pretzels were baked at 500° F. for 8 min. After cooling, the product was analyzed for moisture content and $A_w$ and found to contain 14% water and have an $A_w$ of 0.70.

Alternatively, the mixture containing the diastatic malt and maltodextrin/corn syrup solids can be mixed directly with the flour/yeast mixture and yeast fermentation and oligomaltosaccharide formation take place concurrently for about 2 hours. The remaining mixture containing the maltodextrin/corn syrup solids and monoglyceride can then be added.

EXAMPLE II

A soft pretzel was prepared in a manner similar to that of Example I, except that no shortening was added to the dough and prior to proofing the dough, it was filled with a thermostable cheese filling composition. After baking, the dough portion had an $A_w$ of 0.72 and the filling had an $A_w$ of 0.73.

After 35 days storage (including 14 days at 85° F. and the remainder at 73° F.), a testing panel could detect no significant differences when compared to a 5 day old sample (73° F. storage) except for surface color. Even after 69 and 90 days the testing panel could detect no significant textural differences when compared to 5 day old samples.

EXAMPLE III

A soft pretzel was prepared in a manner similar to that of Example I, except that after proofing the dough was fried in oil at 380° F. for 4 minutes. The product had a moisture content of 16% and an $A_w$ of 0.74.

EXAMPLE IV

Soft pretzels and cheese-filled soft pretzels were prepared by the methods described in Examples I and II, respectively. The pretzels were stored at 85° F. for 14 days inside a polymeric sleeve which was placed in a metallic foil bag. They were then stored for an additional 40 days at 73° F. The pretzels were then removed from the packages and some of them were tested by a test panel in a blind comparison against the corresponding products which were made five days earlier. Panelists were asked to grade each product on a standard scale for a variety of qualities. The results were analyzed for statistically significant differences (95% confidence level) between the stored products and the recently made products.

The stored pretzels which were not tested were then repackaged and stored for additional periods of time, either at 73° F. or 40° F. Some of the samples stored at 73° F. were packaged in a sleeve with a metallic foil bag and others were packaged only in a sleeve. After additional storage periods, the products were removed from their packages and tested against products which had been produced within the previous five days to determine whether any statistically significant differences in properties could be discerned.

Results of the blind comparison tests are summarized in the table below. In the table, the storage periods indicated in each column represent the total storage time under all conditions.

TABLE

| | Plain | | | | | Cheese | | | | | |
|---|---|---|---|---|---|---|---|---|---|---|---|
| | 14 days | 85° F. | 73° F. | | 40° F. | 14 days | 85° F. | 73° F. | | 40° F. | |
| Storage conditions | Remainder | 73° F. | S | S + M | S + M | Remainder | 73° F. | S | S + M | S + M | |
| Storage time (days) | //// | 54 | // 84 | // 84 | // 84 | 35 | /// | 69 90 | 69 90 | 69 90 | |
| Overall Product Acceptability | //// | * | // | // | // | | /// | * | * | | |
| Texture Acceptability | //// | | // | // | // | | /// | | | | |
| Chewiness | //// | | // | // | // * | | /// | | | | |
| Texture | //// | | // | // | // * | | /// | | | | |
| Overall Product Freshness | //// | | // | // | // | | /// | | * | | |
| Flavor Acceptability | //// | * | // | // | // | | /// | * | | | |
| Fresh Bread-like Flavor | //// | | // | // | // * | | /// | * | * | | |
| Aroma | //// | | // | // | // | | /// | * | * | * | |
| Sweetness | //// | * | // | // | // | | /// | | | | |
| Saltiness | //// | | // * | // | // | | /// | * | | * | |
| After Taste | //// | * | // | // | // | | /// | | | | |
| Crust Color | //// | | // | // | // * | * | /// | * | * | * | |

*Significantly different from the fresh:control (95% confidence level)
+ Packaging material: S — sleeve; M — metallized material.

What is claimed is:

1. A method of preparing a shelf-stable, soft dough product having an $A_w$ of 0.75 or less which comprises:
   (a) preparing a leavened dough from a mixture comprising flour, water, and a leavening agent;
   (b) adding to the leavened dough
      (i) at least one antifirming agent including an oligomaltosaccharide;
      (ii) a monoglyceride ester; and
      (iii) at least one starch hydrolyzate selected from maltodextrin and corn syrup solids;
   (c) forming the dough into a desired configuration; and
   (d) cooking the formed dough;
   wherein the oligomaltosaccharide containing antifirming agent is obtained by subjecting maltodextrin or corn syrup solids to the enzymatic activity of diastatic malt and the dough comprises from 15% to 40% flour, from 15% to 30% water, from 2% to 8% monoglyceride ester, and from 20% to 50% maltodextrin or corn syrup solids, inclusive of the maltodextrin or corn syrup solids that are enzymatically modified to produce the oligomaltosaccharide-containing antifirming agent.

2. A method as claimed in claim 1, wherein at least a portion of the starch hydrolyzate is subjected to the enzymatic activity of diastatic malt in water, thereby increasing the amount of oligomaltosaccharides in the starch hydrolyzate.

3. A method as claimed in claim 1, wherein the oligomaltosaccharide antifirming agent comprises oligomaltosaccharide molecules having an average D.P. of from 3 to 10.

4. A method as claimed in claim 1, wherein at least one texture developing agent is present in the mixture for preparing the leavened dough.

5. A method as claimed in claim 4, wherein the texture developing agent is selected from the group consisting of gluten, egg solids, modified pre-gelled starch and whey protein concentration.

6. A method as claimed in claim 1, wherein the monoglyceride ester is a saturated fatty acid monoglyceride ester.

7. A method as claimed in claim 1, wherein the starch hydrolyzate added to the leavened dough has a D.E. from 10 to 30.

8. A method as claimed in claim 1, additionally including the step of adding modified, pre-gelled starch to the leavened dough prior to cooking.

9. A method as claimed in claim 1, wherein the formed dough is fried.

10. A method as claimed in claim 1, wherein the formed dough is baked.

11. A method of preparing a shelf-stable, soft dough product having a water activity of 0.75 or less comprising:
   (a) preparing a leavened dough from a mixture comprising flour, water, yeast, malt and wheat gluten;
   (b) preparing an oligomaltosaccharide antifirming agent by mixing at least one starch hydrolyzate selected from maltodextrin and corn syrup solids, malt and water and allowing the enzymatic activity of the malt to increase the amount of oligomaltosaccharides present in the starch hydrolyzate;

(c) adding the oligomaltosaccharide antifirming agent obtained in step (b) to the leavened dough in step (a);

(d) adding modified, pre-gelled starch, whey protein concentrate, malt, maltodextrin or corn syrup solids and monoglyceride to the leavened dough;

(e) forming the dough into the desired configuration; and (f) cooking the formed dough;

wherein the dough comprises from about 15% to about 40% flour, from 15% to 30% water and from 20% to 50% maltodextrin or corn syrup solids, and about one half of the total maltodextrin or corn syrup solids is subjected to the enzymatic activity of the malt in step (b) and about one half is mixed with the starch, whey protein concentrate and malt in step (d).

* * * * *

UNITED STATES PATENT AND TRADEMARK OFFICE
CERTIFICATE OF CORRECTION

PATENT NO. : 4,803,084

DATED : February 7, 1989

INVENTOR(S) : Ward Shine

It is certified that error appears in the above-identified patent and that said Letters Patent is hereby corrected as shown below:

Column 2, line 26, insert --(b)-- before "adding".

Column 4, line 67, after "about" insert --1--.

Signed and Sealed this

Eighth Day of May, 1990

Attest:

HARRY F. MANBECK, JR.

*Attesting Officer*     *Commissioner of Patents and Trademarks*